2 Sheets—Sheet 1.

S. S. TURNER.

SEWING MACHINE.

No. 1,962.

Reissued May 16, 1865.

2 Sheets—Sheet 2.

S. S. TURNER.

SEWING MACHINE.

No. 1,962.

Reissued May 16, 1865.

Front View of Needle Carrier and Needle.

UNITED STATES PATENT OFFICE.

ELMER TOWNSEND, OF BOSTON, ASSIGNEE OF SIDNEY S. TURNER, OF WESTBOROUGH, MASSACHUSETTS.

IMPROVEMENT IN SEWING-MACHINES.

Specification forming part of Letters Patent No. 11,588, dated August 22, 1854; Reissue No. 363, dated March 25, 1856; Reissue No. 1,962, dated May 16, 1865.

*To all whom it may concern:*

Be it known that SIDNEY STEVENS TURNER, of Westborough, in the county of Worcester and State of Massachusetts, has invented certain Improvements in Sewing-Machines, the nature and operation of which are fully set forth in the following specification, taken in connection with the drawings which accompany and form part thereof.

Figure 1:
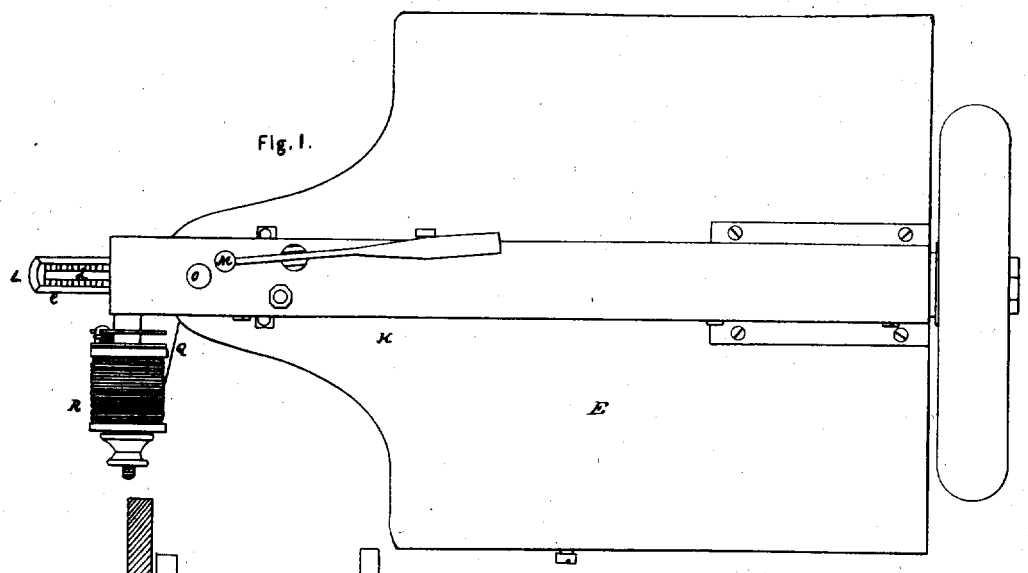
Figure 3:
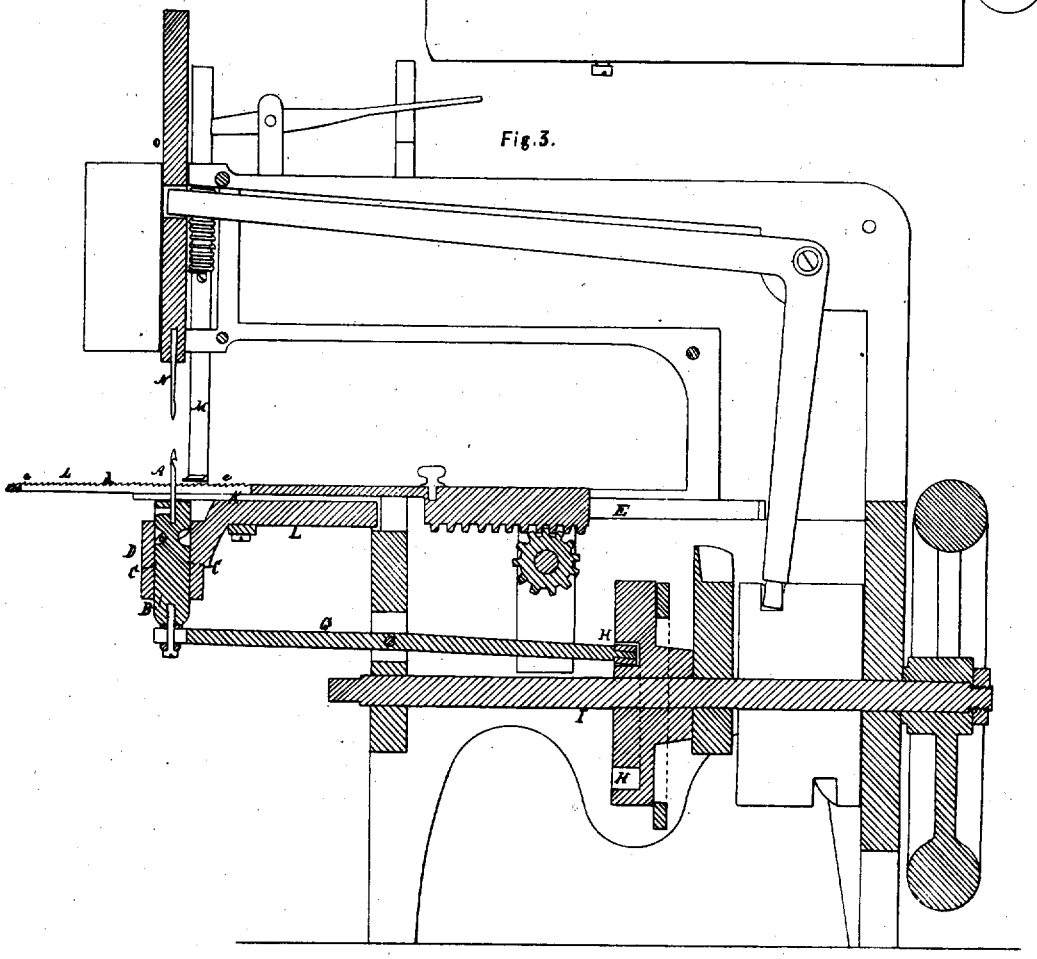
Figure 2:
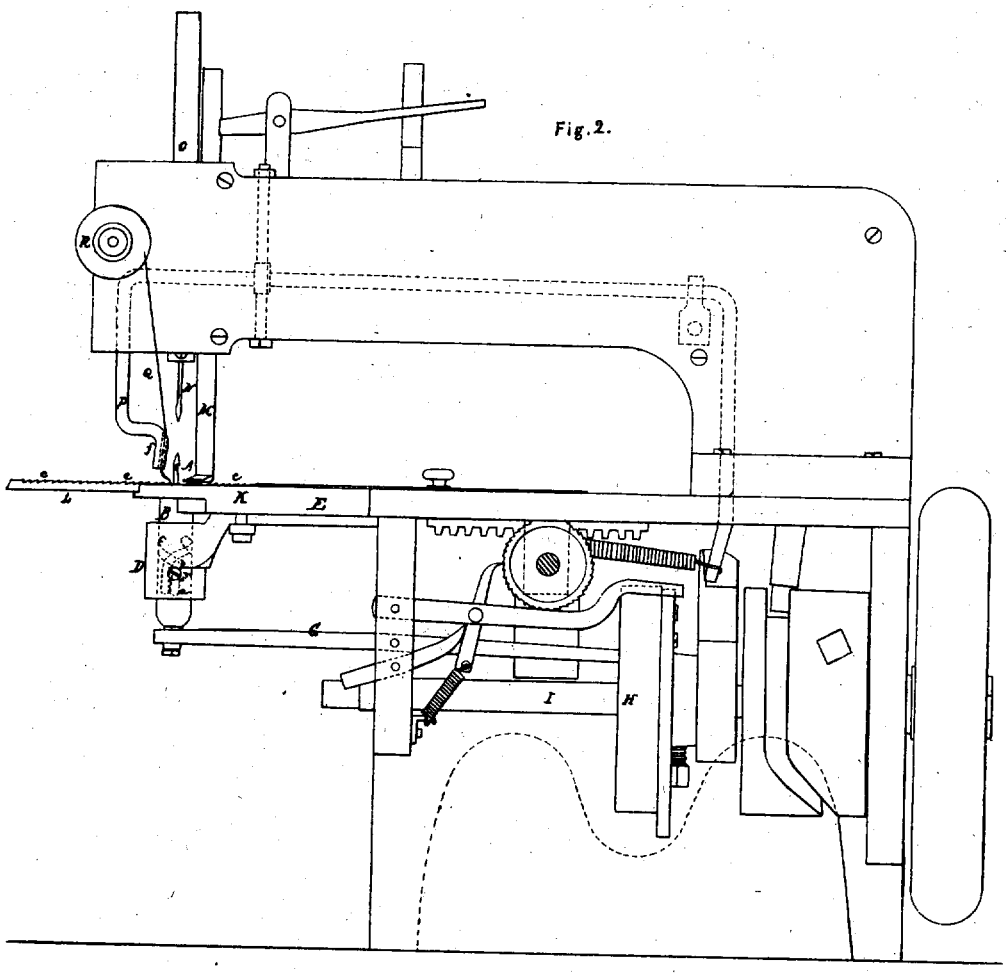
Figure 4:
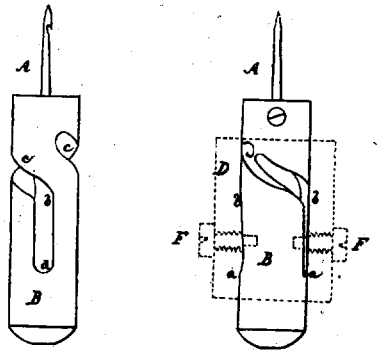

Of said drawings, Figure 1 represents a top view, and Fig. 2 a side elevation, of the improved sewing-machine, the side of the frame being removed for the latter figure to show more clearly the mechanism beneath the table. Fig. 3 is a vertical central and longitudinal section of the machine. Fig. 4 is a side view of the needle-carrier and needle.

The improvement which constitutes this invention consists in the arrangement of a needle to operate from below the table or bed-plate of the machine, such needle passing up through the bed and the work and drawing the thread to form the stitch down through the work, the resistance to the drawing and tightening of the thread in the work being effected by the bed or plate upon which the work is supported, and no needle or auxiliary thread above the table being used in connection with the needle, which operates from below the table, and the thread carried by this needle; also, in the combination of an awl for piercing the holes in the work with a needle for carrying the thread, said needle and awl moving on the same axial line and respectively entering the work in opposite directions, and being withdrawn in opposite directions therefrom; also, in producing a rotative axial motion of the needle for maintaining the hook thereof in proper position, as the work is fed, to keep the thread-loop within the hook when the work is fed along, and in proper position as the needle descends to prevent the hook of the needle from catching in the previously-formed loop.

In the drawings, A represents the needle, formed not unlike other hook or crochet needles heretofore used. The shank of the needle is fastened in the top of a cylindrical carrier, B, and so that its point projects upward from this carrier, as seen in the drawings. This carrier is supported beneath the table or bed-plate E of the machine upon a lever, G, and reciprocates vertically through a cylindrical passage, C, in an arm, D, fastened on the under side of the table. These vertical movements are produced through the lever G, operated upon by a cam, H, on the driving-shaft I, and the carrier B is so applied to the lever G and arm D as to be capable of axial rotative or semi-rotative movement.

Figure 5:
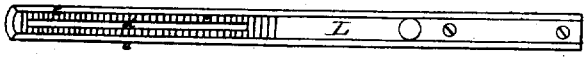

Arranged to slide easily within the top plate, E, of the machine is a feed-bar, L, a top view of which is seen in Fig. 5, said bar sliding lengthwise of the table, and having a long slot, *d*, through which the needle traverses during its passage through and away from the work. The upper surface of this bar may be provided with teeth *e e* for the work to rest upon, said work being held down to or upon the upper surface of the feed-bar by a presser, M, arranged and made to operate as will be readily understood from the drawings, or in any other ordinary or suitable manner.

Above the table E, in line with the needle and in the plane of the center of the slot in the feed-bar, is a vertical awl or piercer, N, fixed in the lower end of a vertically-reciprocating carrier, *o*, which is so actuated by suitable mechanism as to cause the awl to descend and puncture the leather or other material being sewed previous to the upward movement of the needle, such upward movement of the needle carrying its point and hook through the hole thus made by the awl or piercer.

The thread-carrier seen at P receives the thread Q from a bobbin, R, arranged as seen in the drawings. The lower end of the thread-carrier is bent, as seen at Fig. 2, and has a hole, *f*, for the reception and guidance of the thread Q. The thread-carrier is to be so operated by mechanism not herein necessary to describe as to lay the thread once across or in the hook of the needle, when the said hook is presented above the work, in order that the needle, as it descends, shall draw down the thread in the form of a loop. While the thread is thus being laid across the needle or in its hook the throat of the hook is made to stand in a direction toward the presser, the back of the needle being toward the bow of the last-formed loop. While in this position relative to the seam the needle descends vertically until below the upper surface of the work, when the needle begins to rotate, the extent of its rotation during the continuance of the descent of the needle causing the throat or opening of the hook to be presented in a diametrically-opposite position, or to a position approximating thereto. It is while thus below the table that the work is fed, and as this feed is inward, or toward the presser M, it will be obvious that the tendency of the feed would be to draw the loop of thread pulled down by the needle out of the hook if the hook had not been turned in its descent. The rotary movement is therefore given to the hook to such an extent that the pull of the feed shall draw the loop against the part of the needle in rear of or forming the back of the hook. If, however, the needle maintains this last position, with its hook toward the bow of the loop, it will be evident that as the hook, after rising, next descends with the new loop it will be very likely to catch into the bow of the last-formed loop, causing an improper interlacing of the stitches or rupture of the thread. The needle therefore must have two positions as it descends—the first with its hook away from the bow of the last-formed loop to prevent catching of the hook therein, and next with the hook presented opposite to the direction of the feed to prevent the thread being withdrawn from the hook. Generally in machines employing hook or crochet needles the thread is kept in proper position and the hook from catching into the previously-formed loop by means of a slide or "cast-off," which opens and closes the needle-throat at proper times; but with a rotary movement such as described this slide is unnecessary.

The means for effecting this rotary movement, however, is as follows: The arm D has a pin, F, extending from it and into a groove or recess, *a b c*, cut into the surface of the cylinder or carrier B, as seen particularly in Fig. 4. The lower end of this groove, from *a* to *b*, is straight, while the upper end, from *b* to *c*, is helical, encircling or partially encircling the carrier in such manner that the pin and groove shall rotate the carrier as it is moved up and down in the arm D. At the upper end of the needle-stroke the pin is within the straight groove *a b*, producing no rotation of the needle; but as the needle finishes its descent and begins its ascent the pin, extending into the groove *b c*, produces the requisite rotation, as before explained.

In sewing-machines constructed before this invention it has been customary to operate the needle from above the table or work-supporting surface, sometimes employing a co-operating needle, sometimes a shuttle, and sometimes a looper below the table, but always having a needle or a second thread above the table. This arrangement was objectionable, because the pull of the needle upon the thread to tighten the stitch as the needle ascended pulled the work against a yielding presser-bar, which operation, in using a heavy or waxed thread, would cause the presser-bar to give or yield to such an extent as to cause an insufficient "drawing up" of the stitch, and also in chain-stitch sewing-machines, because in such arrangement the looping or fastening of the successive stitches together was upon the upper surface of the work and the single line of thread upon the lower surface thereof, where it was hid from the sight of the operator, and said surface being generally the finished surface, near and parallel to the edges of which it was desirable to form the seam, the operator could not see to guide the work to the needle, as is necessary to secure a uniformly even distance of seam from the edges of the material. When two needles have been employed—one above and one below the table—the successive or alternate stitches are not drawn evenly or tightly into the work, because the upper needle or thread carrier did not draw against an unyielding work-supporting surface. By the arrangement of the needle below and to work up through the work-supporting surface these difficulties are overcome, because the pull of the thread for each stitch is directly against the unyielding surface of the bed E, and because the looping or fastening of the successive stitches together is thereby produced on the under surface of the work, leaving the single or continuous line of thread upon the upper and exposed surface thereof.

As before remarked, there is arranged an awl or piercer, N, above the table to co-operate with the needle A, which is actuated from beneath the table, the awl puncturing the holes through which the needle enters to seize the thread.

Where an awl and needle have before this invention been employed in sewing work placed upon a table or bed, they have both operated from the same side of the work-supporting surface, the awl puncturing a hole in the work in its descent, into which hole the needle entered in its next descent. This arrangement was objectionable because it left a beard or projection from the leather, made by the awl on the surface opposite to that from which the awl entered, whereas by having the needle and awl enter from opposite surfaces the beard or edge projected from the work by the action of the awl is forced back into the hole by the needle, and the needle of course does not force the work out on the opposite side from which it enters, because the hole has already been punctured. The surface of the work, therefore, contiguous to or surrounding the awl-hole is, by the action of the awl and needle from opposite sides thereof, left smooth and free from projections. Said prior arrangement of the awl and needle was also objectionable, inasmuch as the awl operated ahead of the needle the distance of one stitch therefrom. Consequently stitches of but one length could be taken unless provision was made for changing the distance apart of the needle and the awl, and in either case there frequently occurred discrepancy between the distance which the work was fed for each stitch and the distance apart of the awl and needle. By the arrangement of the awl and needle as herein described as part of this invention the direction of the seam may be changed with certainty that the needle will enter the hole formed for its reception by the awl, while if the awl operates ahead of the needle abrupt changes in the direction of the seam will cause the needle to make its own hole, or else the needle will be broken or bent in glancing or deflecting from its normal path into the hole formed by the awl.

What is claimed is—

1. The combination, in a sewing-machine, of an automatic feed, a work-supporting surface, and a needle, when the needle is arranged to operate from below the table or work-supporting surface, and without the co-operation of a second thread (or a device carrying a second thread) above the table or work-supporting surface.

2. The combination together of a needle and awl, when the same enter the work in opposite directions, and each withdraws in a direction opposite that from which it entered.

3. The combination, in a sewing mechanism, of an automatic needle-turner and automatic feed, by which the loop is kept in proper position with respect to the needle as the work progresses.

4. The method of effecting the rotation of the hook, substantially as specified.

In witness whereof I have hereunto set my hand this 11th day of January, A. D. 1865.

ELMER TOWNSEND.

Witnesses:

J. B. CROSBY,

F. GOULD.